(12) United States Patent
Elvanoglu et al.

(10) Patent No.: US 7,318,238 B2
(45) Date of Patent: Jan. 8, 2008

(54) SECURITY SETTINGS FOR MARKUP LANGUAGE ELEMENTS

(75) Inventors: Ferhan Elvanoglu, Redmond, WA (US); Rajeev Dujari, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 637 days.

(21) Appl. No.: 10/047,302

(22) Filed: Jan. 14, 2002

(65) Prior Publication Data

US 2003/0135504 A1 Jul. 17, 2003

(51) Int. Cl.
*H04L 9/00* (2006.01)
(52) U.S. Cl. ........................................ 726/30; 713/176
(58) Field of Classification Search ................ 713/176; 709/203; 715/513
See application file for complete search history.

(56) References Cited

U.S. PATENT DOCUMENTS

| | | | | |
|---|---|---|---|---|
| 4,984,272 A | * | 1/1991 | McIlroy et al. ................ 726/17 |
| 5,428,529 A | * | 6/1995 | Hartrick et al. ............. 715/513 |
| 5,729,710 A | * | 3/1998 | Magee et al. ................ 711/203 |
| 5,771,383 A | * | 6/1998 | Magee et al. ................ 719/312 |
| 5,812,394 A | * | 9/1998 | Lewis et al. .................. 700/17 |
| 5,931,900 A | * | 8/1999 | Notani et al. ................ 709/201 |
| 5,941,947 A | * | 8/1999 | Brown et al. ................ 709/225 |
| 5,974,549 A | * | 10/1999 | Golan .......................... 726/23 |
| 5,983,348 A | * | 11/1999 | Ji ................................. 726/13 |
| 5,995,945 A | * | 11/1999 | Notani et al. .................. 705/28 |
| 6,006,228 A | * | 12/1999 | McCollum et al. ............ 707/9 |
| 6,029,245 A | * | 2/2000 | Scanlan ....................... 713/200 |
| 6,041,309 A | * | 3/2000 | Laor ............................ 705/14 |
| 6,158,007 A | * | 12/2000 | Moreh et al. .................. 726/1 |
| 6,266,681 B1 | * | 7/2001 | Guthrie .................... 715/501.1 |
| 6,272,641 B1 | * | 8/2001 | Ji ................................. 726/24 |
| 6,311,269 B2 | * | 10/2001 | Luckenbaugh et al. ..... 713/154 |
| 6,321,334 B1 | * | 11/2001 | Jerger et al. ................. 713/200 |
| 6,345,361 B1 | * | 2/2002 | Jerger et al. ................. 713/200 |
| 6,366,912 B1 | * | 4/2002 | Wallent et al. .................. 707/9 |
| 6,457,130 B2 | * | 9/2002 | Hitz et al. ..................... 726/27 |
| 6,460,079 B1 | * | 10/2002 | Blumenau ................... 709/223 |

(Continued)

FOREIGN PATENT DOCUMENTS

JP 2001325249 * 11/2001

OTHER PUBLICATIONS

Anupam et al., Secure Web Scripting, Nov.-Dec. 1998, IEEE Internet.*

(Continued)

*Primary Examiner*—Nasser Moazzami
*Assistant Examiner*—David Garcia Cervetti

(57) ABSTRACT

A system and method that allows a page (e.g., Internet content) author to associate a set of security settings on any desired element (e.g., tag) of the page. When the page is interpreted, each element is handled based on its associated security settings, allowing a page author to request that any element be considered differently with respect to security than other elements, and/or differently relative to the page that contains it. A negotiator determines the actual settings for elements to ensure that security cannot be compromised by tagging an element such that it has the ability to do more than desired. The negotiator also determines the settings for elements that do not have specifically associated security data, e.g., elements without specified security settings may inherit security settings from higher elements, or the top-level container. The settings may correspond to those of a security zone.

47 Claims, 5 Drawing Sheets

U.S. PATENT DOCUMENTS

| | | | |
|---|---|---|---|
| 6,473,800 B1* | 10/2002 | Jerger et al. | 709/226 |
| 6,516,308 B1* | 2/2003 | Cohen | 706/12 |
| 6,519,647 B1* | 2/2003 | Howard et al. | 709/229 |
| 6,526,513 B1* | 2/2003 | Shrader et al. | 726/4 |
| 6,546,546 B1* | 4/2003 | Van Doorn | 717/114 |
| 6,553,393 B1* | 4/2003 | Eilbott et al. | 715/513 |
| 6,594,664 B1* | 7/2003 | Estrada et al. | 707/10 |
| 6,598,046 B1* | 7/2003 | Goldberg et al. | 707/5 |
| 6,601,233 B1* | 7/2003 | Underwood | 717/102 |
| 6,629,081 B1* | 9/2003 | Cornelius et al. | 705/30 |
| 6,636,889 B1* | 10/2003 | Estrada et al. | 709/203 |
| 6,662,341 B1* | 12/2003 | Cooper et al. | 715/513 |
| 6,691,153 B1* | 2/2004 | Hanson et al. | 709/204 |
| 6,701,376 B1* | 3/2004 | Haverstock et al. | 709/246 |
| 6,724,406 B1* | 4/2004 | Kelley | 715/804 |
| 6,728,762 B1* | 4/2004 | Estrada et al. | 709/218 |
| 6,748,425 B1* | 6/2004 | Duffy et al. | 709/217 |
| 6,754,702 B1* | 6/2004 | Kennelly et al. | 709/223 |
| 6,772,167 B1* | 8/2004 | Snavely et al. | 707/102 |
| 6,772,393 B1* | 8/2004 | Estrada et al. | 715/512 |
| 6,785,790 B1* | 8/2004 | Christie et al. | 711/163 |
| 6,792,113 B1* | 9/2004 | Ansell et al. | 380/284 |
| 6,820,261 B1* | 11/2004 | Bloch | 718/100 |
| 6,823,433 B1* | 11/2004 | Barnes et al. | 711/163 |
| 6,850,252 B1* | 2/2005 | Hoffberg | 715/716 |
| 6,854,039 B1* | 2/2005 | Strongin et al. | 711/163 |
| 6,871,321 B2* | 3/2005 | Wakayama | 715/513 |
| 6,898,618 B1* | 5/2005 | Slaughter et al. | 709/203 |
| 6,931,532 B1* | 8/2005 | Davis et al. | 713/167 |
| 6,941,459 B1* | 9/2005 | Hind et al. | 713/167 |
| 6,959,336 B2* | 10/2005 | Moreh et al. | 709/229 |
| 6,961,849 B1* | 11/2005 | Davis et al. | 713/167 |
| 6,978,367 B1* | 12/2005 | Hind et al. | 713/167 |
| 7,010,681 B1* | 3/2006 | Fletcher et al. | 713/154 |
| 2001/0013096 A1* | 8/2001 | Luckenbaugh et al. | 713/154 |
| 2001/0039622 A1* | 11/2001 | Hitz et al. | 713/201 |
| 2001/0043237 A1* | 11/2001 | Schmieder | 345/839 |
| 2001/0049671 A1* | 12/2001 | Joerg | 706/50 |
| 2001/0054049 A1* | 12/2001 | Maeda et al. | 707/517 |
| 2002/0010679 A1* | 1/2002 | Felsher | 705/51 |
| 2002/0019936 A1* | 2/2002 | Hitz et al. | 713/165 |
| 2002/0046290 A1* | 4/2002 | Andersson et al. | 709/237 |
| 2002/0087479 A1* | 7/2002 | Malcolm | 705/64 |
| 2002/0107889 A1* | 8/2002 | Stone et al. | 707/513 |
| 2002/0107890 A1* | 8/2002 | Gao et al. | 707/513 |
| 2003/0023445 A1* | 1/2003 | Trifon | 704/270.1 |
| 2003/0023880 A1* | 1/2003 | Edwards et al. | 713/201 |
| 2003/0025727 A1* | 2/2003 | Rath et al. | 345/744 |
| 2003/0051027 A1* | 3/2003 | Aupperle et al. | 709/224 |
| 2003/0061482 A1* | 3/2003 | Emmerichs | 713/165 |
| 2003/0061512 A1* | 3/2003 | Flurry et al. | 713/201 |
| 2004/0078577 A1* | 4/2004 | Feng et al. | 713/182 |
| 2004/0187031 A1* | 9/2004 | Liddle | 713/201 |
| 2004/0199603 A1* | 10/2004 | Tafla et al. | 709/217 |

OTHER PUBLICATIONS

Wayback Machine, Security Attribute, Apr. 17, 2001, Microsoft, http://web.archive.org/web/20010417082017/http://msdn.microsoft.com/workshop/author/dhtml/reference/properties/security.asp.*

CERT.org, Understanding Malicious Content Mitigation for Web Developers, Feb. 2000, http://www.cert.org/tech_tips/malicious_code_mitigation.html.*

Ned Snell, Sams Teach Yourself the Internet in 24 Hours, Third Edition, Jun. 1999, accessed at http://proquest.safaribooksonline.com/0672315890/ch08lev1sec3□□.*

Oasis, Oasis Security Services Use Cases and Requirements, May 30, 2001.*

Oasis, oasis SSTC SAML Protocols Schema Discussion, Jul. 23, 2001.*

Selkirk, Using XML security mechanisms, Jul. 2001, BT Technology Journal.*

Selkirk, XML and security, Jul. 2001, BT Technology Journal.*

Oasis, Bindings and profiles for the Oasis Security Assertion Markup Language (SAML), Jan. 10, 2002.*

Hallam-Baker, X-TASS: XML Trust Assertion Service Specification, Jan. 5, 2001, Verisign.*

Vuong et al., Managing security policies in a distributed environment using eXtensible Markup Language (XML), 2001, IEEE.*

Bertino et al., On Specifying Security Policies for web documents with an XML-based language, May 2001, ACM.*

Edwards, Mark Joseph, "The Guide to Internet Explorer Security Zones" Jan. 2000.

Sliwa, Carol, "Microsoft Bolsters Internet Explorer Security" Network World Fusion, Jun. 9, 1997, www.nwfusion.com/archive/1997/97-06-09micr-a.html.

* cited by examiner

SECURITY SETTINGS FOR MARKUP LANGUAGE ELEMENTS

FIELD OF THE INVENTION

The invention relates generally to computer systems and the Internet, and more particularly to Internet security and privacy.

BACKGROUND OF THE INVENTION

The Internet, which in essence includes a large number of networked computers distributed throughout the world, has become an extremely popular source of virtually all kinds of information. Increasingly sophisticated computers, software, and networking technology have made Internet access relatively straightforward for end users. For example, conventional browser software allows a user to request information such as a web page from a web site on one or more remote computers. To this end, the user provides the address of the web page (e.g., a uniform resource identifier, or URI) in some manner to the browser software, and the browser software transmits the request using a well known communication protocol such as the HyperText Transport Protocol (HTTP). The request is then routed to the destination computer or web site based on the address.

When the request is received, the remote web site evaluates the request and returns an appropriate response, which may include the requested information in some markup language, e.g., a HyperText Markup Language (HTML), or similarly formatted content. The browser software interprets the returned content to render a page or the like upon the user's computer display.

As part of handling the returned page that is loaded into a browser instance, the content that makes up that page may be associated with a security zone, such as described in U.S. patent application Ser. No. 09/055,772, assigned to the assignee of the present application and issued as U.S. Pat. No. 6,366,912 on Apr. 2, 2002. The association of the content with a security zone is based on the content's source, such as the web site from which it was obtained, e.g., as determined from its URL (Uniform Resource Locator, or URI, Uniform Resource Identifier). For example, a URL starting with "http//:www" may be associated with an Internet security zone.

A security zone corresponds to a set of security settings for that content, i.e., for each security zone there are a set of security settings, comprising, for example, locally maintained data specifying rules for possible actions, such as whether or not any script in the content can be run, whether specified controls (e.g., ActiveX® controls) may be loaded, and so on. Note that security settings can specify more than yes or no decisions, such as a setting indicating that the user should be prompted for a decision at the time that a decision (e.g., whether to download) needs to be made.

When an action needs to be taken, the security settings corresponding to a page are accessed to determine whether to allow or deny the action, prompt the user or the like, or take some other action (e.g., consult some other data to make the determination). In any event, the security zone thus controls what actions received content can and cannot perform. Browser software may ship with default settings for the zones, and the user may adjust them from there, or obtain them from some other source. For example, the settings may be such that content downloaded from the Internet is allowed to do less (at least without prompting) than content loaded from an Intranet, e.g., content received from the Intranet-zone may be automatically allowed to load an ActiveX® control, while similar content received from the Internet zone may require the user to decide via a prompt whether or not such a control can be loaded.

In addition to Internet and Intranet zone distinctions, the user may specify in some manner (e.g., via a browser user interface) that particular URLs corresponding to certain web sites are trusted, thus giving them trusted (less restrictive) security settings. On the other end, a user may specifically assign URLs of untrusted sites to a restricted zone, having very restrictive security settings. When content is received from such a site, the content is associated with the trusted or restricted security settings as appropriate, rather than the Internet or Intranet settings. Thus, for example, a reputable site can be specifically identified as trusted, so that it will get trusted security settings instead of falling via its URL into the Internet security zone. At the same time, a website characterized as restricted will not be associated with the Internet zone settings, for example, but will get the more restrictive settings of the restricted security zone. One other security zone corresponds to the local computer, e.g., files that do not have a corresponding URL, but rather are present in local storage such as on a disk drive, can have other security settings, which are generally very unrestricted. Note that the local computer zone does not apply to cached Internet and Intranet content, (with URLs), so that zone security is not defeated simply because that content happened to be cached and was thus recalled locally instead of remotely. Still other zones are feasible.

While security zones thus provide security in accordance with default settings and/or a user's preferences, when a web site points to content that is on that same site, and loads that content in a frame, the content that is loaded in the frame has the same security privileges that the top level document is given, since the security zone is set for the top level document and the domain does not change with this pointed-to content. In one example scenario in which content contains HTML and script, this causes a problem when the content is only stored on that site, but does not belong to the site owner, since the site owner typically does not have a way to verify that loading this HTML and script combination in a user's machine would not pose any security risks.

By way of example of this problem, consider a site such as Hotmail. Hotmail is a popular electronic mail service which users access via the Internet to receive and send messages. When a user uses Hotmail, the user navigates to a site that (ordinarily) corresponds to the Internet security zone. Because Hotmail requires script to function, to use Hotmail, execution of script needs to be enabled in the Internet security zone.

In operation, Hotmail collects user credentials, and loads an e-mail message in a frame. Since that message is in the same domain with Hotmail's top level page, there is no cross-domain security applied to that frame. As a result, if that frame contained HTML content, then any script therein will run, and can access the parent document, since they are on the same domain and Hotmail needs scripting to be enabled. Thus, if Hotmail allowed it, the HTML inside the e-mail message could include malicious content, such as content comprising script that steals the user's credentials when run.

To solve this problem, before Hotmail provides access to an e-mail message, Hotmail parses each email message, and strips off all style tags, script and anything that is interactive with the e-mail message, thereby preventing malicious content from causing harm. However, as a consequence, the end user does not see any proper formatting and style, even when reading an HTML-based message, since the Hotmail server has to remove such content. In general, although users may trust the site itself, users lose many of the benefits of HTML in order to protect against its possible misuse by other's content made available through that site.

SUMMARY OF THE INVENTION

Briefly, the present invention provides a system and method that allows the author of the page (e.g., of Internet content) to associate a different set of security settings (e.g., a security zone) on any desired element (e.g., tag) on an authored page. When the page is interpreted and/or otherwise processed for rendering, each element is handled based on its associated security settings, whereby the settings may be used to allow, deny or otherwise handle (e.g., prompt for) an action of the element. Among other benefits, this allows a page author to request that any element that is on a page be considered differently with respect to security than other elements, and/or differently relative to the page that contains it. Further, privacy settings may be treated like security settings, whereby privacy related issues may be distinguished between elements on a page.

A negotiator (e.g., local and rule-based) determines the actual settings for elements. Among other things, this ensures that security cannot be compromised by tagging an element such that it has the ability to do more than desired, e.g., more than is allowed for its parent container. The negotiator also determines the settings for elements that do not have specifically associated security data. For example, elements without specified security settings may inherit security settings from higher elements, or the top-level container, which may correspond to a security zone (e.g., determined via the top-level domain's URL) or another set of associated security settings.

Other advantages will become apparent from the following detailed description when taken in conjunction with the drawings, in which:

DETAILED DESCRIPTION

Exemplary Operating Environment

Figure 1:
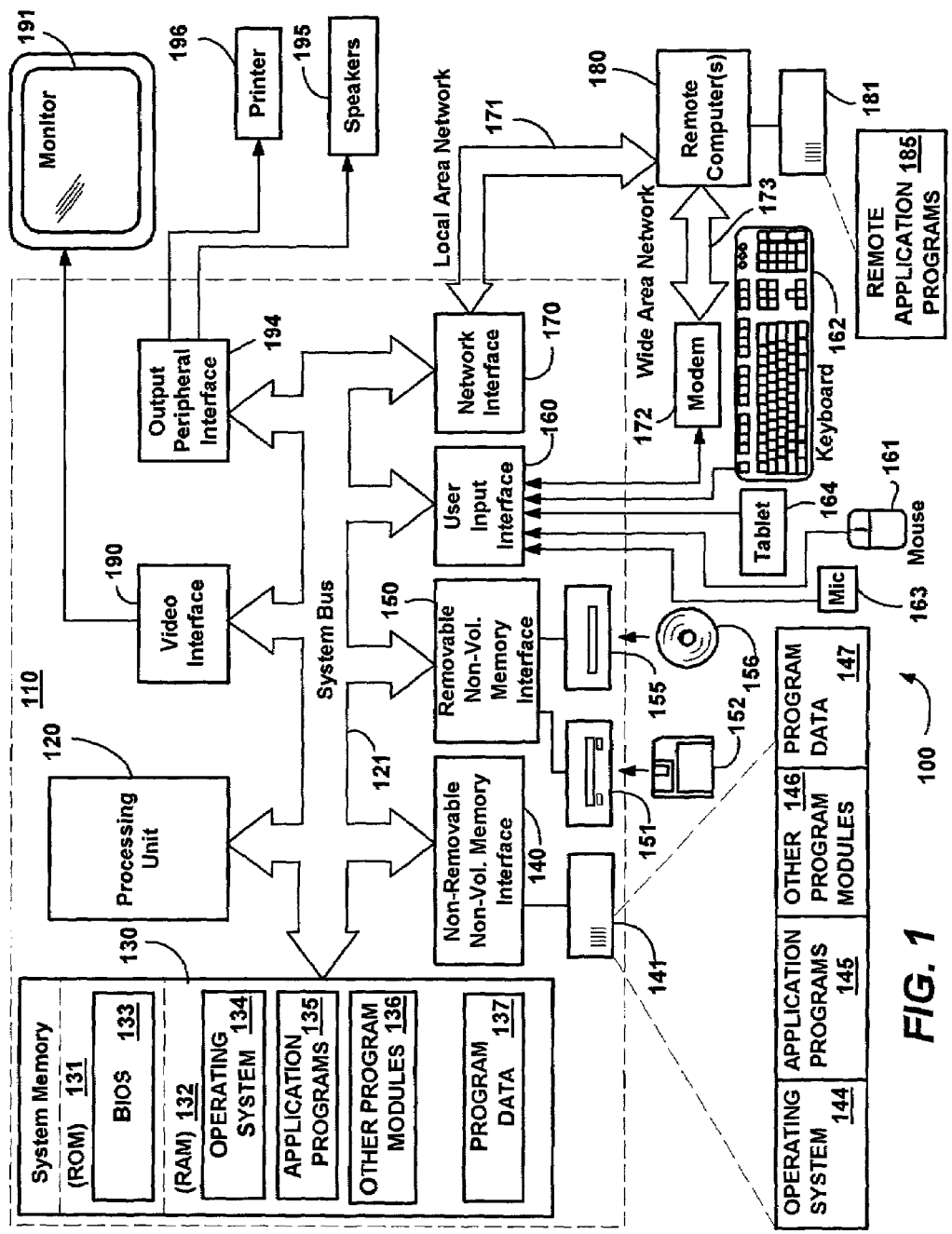
FIG. 1 is a block diagram generally representing a computer system into which the present invention may be incorporated.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to: personal computers, server computers, hand-held or laptop devices, tablet devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, and so forth, that perform particular tasks or implement particular abstract data types. The invention may also be practiced in distributed computing environments where tasks are performed by remote processing devices that are linked through a communications network. In a distributed computing environment, program modules may be located in local and/or remote computer storage media including memory storage devices.

With reference to FIG. 1, an exemplary system for implementing the invention includes a general purpose computing device in the form of a computer 110. Components of the computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 110 typically includes a variety of computer-readable media. Computer-readable media can be any available media that can be accessed by the computer 110 and includes both volatile and nonvolatile media, and removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data. Computer storage media includes, but is not limited to, Random-Access Memory (RAM), Read-Only Memory (ROM), Electronically Erasable Programmable Read-Only Memory (EEPROM), flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by the computer 110. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, Radio Frequency (RF), infrared and other wireless media. Combinations of the any of the above should also be included within the scope of computer-readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136 and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media, discussed above and illustrated in FIG. 1, provide storage of computer-readable instructions, data structures, program modules and other data for the computer 110. In FIG. 1, for example, hard disk drive 141 is illustrated as storing operating system 144, application programs 145, other program modules 146 and program data 147. Note that these components can either be the same as or different from operating system 134, application programs 135, other program modules 136, and program data 137. Operating system 144, application programs 145, other program modules 146, and program data 147 are given different numbers herein to illustrate that, at a minimum, they are different copies. A user may enter commands and information into the computer 110 through input devices such as a tablet, or electronic digitizer, 164, a microphone 163, a keyboard 162 and pointing device 161, commonly referred to as mouse, trackball or touch pad. Other input devices not shown in FIG. 1 may include a joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. The monitor 191 may also be integrated with a touch-screen panel or the like. Note that the monitor and/or touch screen panel can be physically coupled to a housing in which the computing device 110 is incorporated, such as in a tablet-type personal computer. In addition, computers such as the computing device 110 may also include other peripheral output devices such as speakers 195 and printer 196, which may be connected through an output peripheral interface 194 or the like.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet. For example, in the present invention, the computer system 110 may comprise source machine from which data is being migrated, and the remote computer 180 may comprise the destination machine. Note however that source and destination machines need not be connected by a network or any other means, but instead, data may be migrated via any media capable of being written by the source platform and read by the destination platform or platforms.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160 or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Element Security Control

The present invention is generally directed towards security (and privacy) in browser software (or similar networking) software executing on a client machine. As is understood, however, such browser software can comprise many components, some of which may be integrated with other components, or separated from others. For example, part or all of the security mechanism (described below) can be integrated into the network transport component that receives downloaded content, such that security can be internally handled (at least in part) when received, prior to any interpretation of the content for rendering. Alternatively, the software that interprets the content can invoke the security mechanism as needed. A combination of the above (e.g., some initial security pre-processing, some at the time of content interpretation) is also feasible. As such, it should be understood that the components described herein are examples, and that the present invention is not limited to any particular configuration or implementation of such components. As essentially used herein, the term "interpret" in any of its forms (e.g., interprets, interpreted, interpreting) and so on is intended to refer to any type of processing the browser software performs on content, e.g., pre-processing, parsing, and so forth.

Further, while the invention will be generally described with respect to Hyper-Text Markup Language (HTML), it is understood that virtually any type of content may benefit from the present invention, regardless of how formatted, such as Extensible Markup Language (XML), Extensible Hyper-Text Markup Language (XHTML) and other XML-based scenarios, including other content with a hierarchical structure or content with a non-hierarchical structure. Thus, as used herein a "page" is not limited to any particular type of content or structure. Similarly, as will be apparent, as used herein an "element" includes tags (e.g., a DIV tag within a stream of HTML) or the like in a page, as well as higher-level hierarchical elements, such as HTML frames and images which compose a visual "page".

Figure 2:
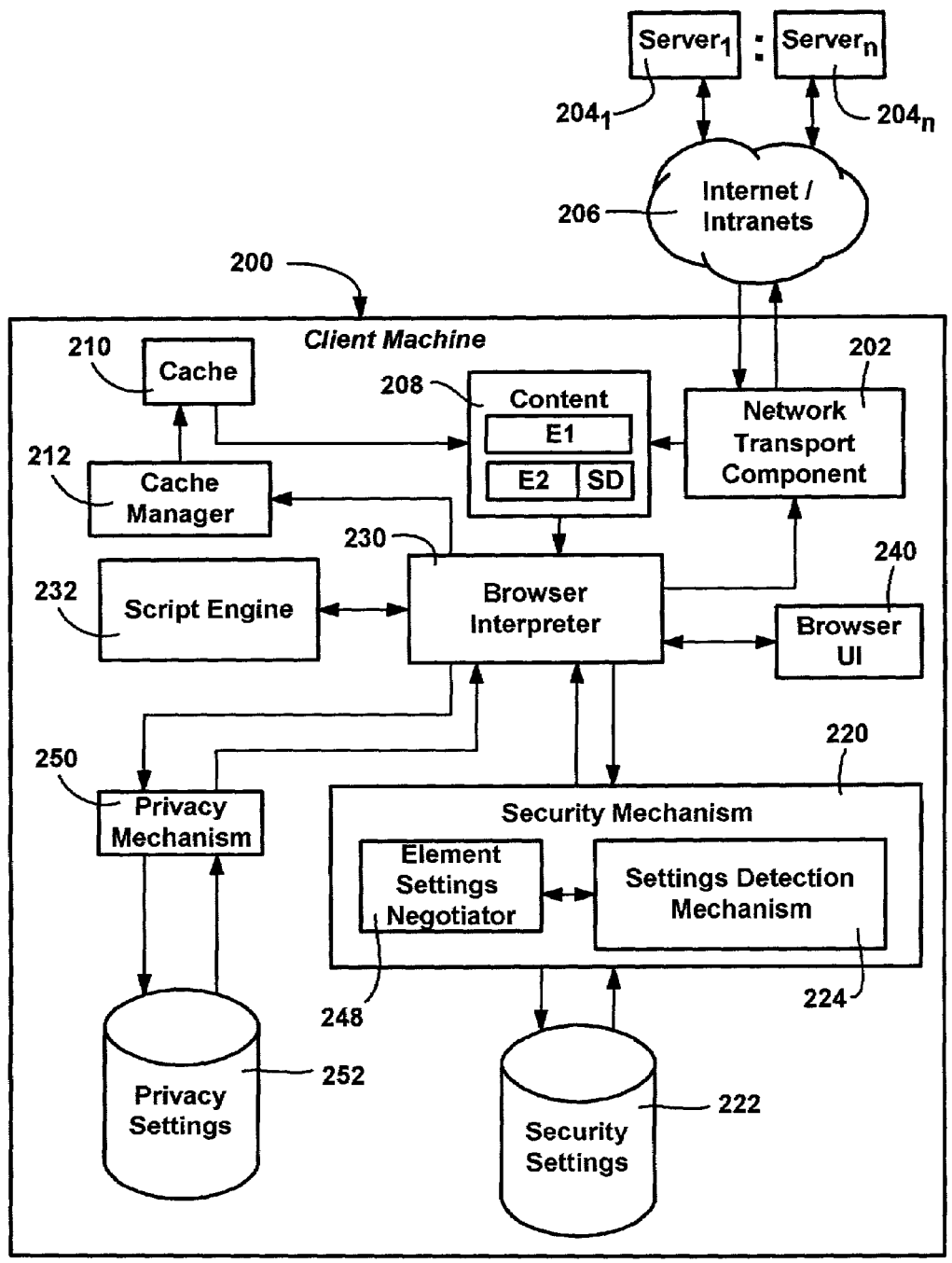
FIG. 2 is a block diagram generally representing various components for handling security associated with an element on a page of content in accordance with one aspect of the present invention.

FIG. 2 shows a generalized conceptual model providing various aspects of the present invention, wherein browsing or similar networking software (represented as various components) executing in a client machine 200 (e.g., the computer system 110 of FIG. 1) communicates via a network transport component 202 with various remote servers $204_1$-$204_n$ (e.g., the remote computer(s) 180 of FIG. 1), such as over the Internet or an Intranet 206. In general, the servers $204_1$-$204_n$ may be considered as Internet or Intranet servers, and the communications may include requests for content or the like (e.g., HTTP "GET" requests) which result in content 208 being received from the servers $204_1$-$204_n$. Communication between the client machine 200 and the server $204_1$-$204_n$ typically uses a well-known network protocol, such as hypertext transfer protocol (HTTP). As used herein, "server" or "network server" includes any machine or combination of machines having content maintained thereon or in association therewith. Network servers may thus include HTTP "web sites," including those having sites with different names (which may be regarded as different virtual servers even if they are hosted on the same physical machine). Note that a web site may be distributed over many virtual servers, which in turn may be distributed over many physical machines.

As also represented in FIG. 2, some or all of the content 208 may also be received from a cache 210, managed by a cache manager component 212 or the like. Note that the content 208 may be received at different times and/or from different sources, e.g., while interpreting one part of the content 208, other content may be referenced therein, resulting in the (possible) loading of additional content from one of the servers $204_1$-$204_n$ or the cache 210.

As further represented in FIG. 2, a security mechanism 220 may be invoked to process at least some of the content against security settings 222 typically maintained at the client machine 200. To this end, the security mechanism may include a settings detection mechanism 224 that analyzes the content and/or content-related information such as its source to determine which security settings apply. For example, the settings detection mechanism 224 may analyze the URL of the domain from which the content was received to determine a security zone that corresponds to that URL, whereby the appropriate security settings may then be retrieved based on the zone that was determined.

In accordance with one aspect of the present invention, instead of providing security only in association with a zone of the URL's domain, security data may be provided on one or more individual elements (e.g., corresponding to an HTML tag) within received content 208. This is represented in FIG. 2 by elements E1 and E2, wherein element E2 has associated security data SD. For example, with respect to a FRAME tag or IFRAME tag, the following may be present in received content:

<frame security="restricted"
src=http://www.evilemailsite.com>
</frame>

To accomplish such element security on one or more individual elements, browser interpreter software 230 invokes the security mechanism to provide (e.g., via the settings detection mechanism 224) the settings and/or a decision associated with an action. For example, before invoking a script engine 232 to run script, the browser interpreter software 230 can communicate with the security mechanism 220 to obtain a determination as to whether script may be run. Alternatively, the browser interpreter software 230 can simply request the settings, e.g., which the settings detection mechanism 224 can provide, and read them itself before taking any action. This may be more efficient than calling into the security mechanism for each decision, since, for example, a set of settings (e.g., restricted) can be temporarily preserved by the browser interpreter software 230 and then re-read whenever a decision is needed. In any event, the decision is available when needed, and the page may be rendered in accordance with the security settings, such as via a browser user interface component 240.

In the above example, a frame element is thus associated with a restricted security zone. However, the present invention is not limited to security zones and/or frames, but indeed, handles virtually any type of tag and/or security settings association mechanism, as long as the browser software and security mechanism knows the format of the settings. As can be readily appreciated, any other element, e.g., SCRIPT tags, IMG (image) tags and so on can be similarly associated with security settings. For example, consider the following that may be present within content:

<script security="http://www.goodsite.com/secur.set.txt"
:
:
</script>

In this example, not only is a script tag being associated with security, but rather than limit it to one of the zones, the security settings can be downloaded, such as from a trusted site that provides a security settings file, e.g., digitally signed. Alternatively, the reference could be to a local file. As long as the security mechanism can understand the referenced file sufficiently to obtain the security settings, e.g., via a predetermined format, the security settings can be associated with the element. For example, contemporary browsing software such as Microsoft® Corporation's Internet Explorer allows a user to set disable, enable, or prompt for many such settings, e.g., for various downloads and plug-ins, and also set safety levels and logon settings for other actions. Any file that can control some or all of these settings would suffice for this purpose.

Moreover, instead of a file reference, the settings themselves could be sent, such as in a text string or the like. Note that whether accessed directly or via a file, a benefit is that the author is not limited to zones, although the author can still use zones if desired. Note that zones can change from user to user depending on any customizations, meaning that one user might have a different experience than another user if only a zone is specified, which may not be desirable.

Thus, in general, an aspect of the present invention allows a page author to associate security data with an element, such as by tagging the element with an associated zone, or the actual settings themselves, via a settings string or a file. It is also feasible to tag an element with a relative security information reference, such as "make more secure," whereby, for example, if an action would be otherwise allowed (enabled), the "make more secure" setting will instead prompt the user to decide on the action. Similarly, an element may be tagged with relative security information such as "increase security by n zones" whereby any security zone that currently applies would be made more secure by the value of n zones. Another relative way to tag an element such as a frame element that has an associated URL, would be to specify something like "Check URL zone" such that the zone settings would apply to that URL, which may be different from those of the topmost container. For example, the topmost container may correspond to trusted, with frames loaded therein being whatever they would be if they were navigated to directly, e.g., the Internet zone.

As can be appreciated, these and other various mechanisms give an author a way to control the security settings that are applied to any element on a page, including frames that load the content of others. Thus, in the Hotmail example described above, the hotmail page author can have the security settings that correspond to the Internet zone applied to its own content, while the messages can be associated with the restricted zone, or a set of settings that are very restrictive. This eliminates the need to strip off the tags at the server, since the restricted zone or other specified settings at the client machine will prevent the content from performing malicious actions, such as by disabling script from running while enabling other things, such as proper formatting and style, to be provided. One straightforward way to do this is to author the page such that the frame tags that contain messages are associated with the restricted security zone, whereby each externally received message element (contained by FRAME or IFRAME tags) is associated with more restrictive security settings than those of the top-level domain/container.

Regardless of the received security data, the local browser software is still in control of the received content, and thus the elements tagged with security-related data generally can be considered more like requests for certain security settings as opposed to commands that will be unconditionally granted. For example, a malicious source of content may tag its content with a script element as "trusted" in an attempt to benefit from the increased flexibility of the present invention. Accepting this unconditionally cannot be allowed, of course, in a practical model.

To prevent such occurrences, one aspect of the present invention includes an element settings negotiator 248 or the like, that, based on some rule or rules, locally retains control of the security, rather than simply give it to the content. For example, the element settings negotiator 248 may be incorporated in the security mechanism 220 and be configured with rules that never allow a security-tagged element to allow an action that a parent element containing that tag would not allow. Thus, if within a frame tagged as "restricted," a "trusted" or other tag would not have any effect. Note, however, that this is only one way to negotiate the settings, and it is feasible to have the element settings negotiator 248 configured to allow an action at a child element that would be prevented by its parent container, as described below. Indeed, the security settings that apply to any parent container and/or element within can be controlled in virtually any way by the element settings negotiator 248, providing extreme flexibility, e.g., any element on a page can be associated with any set of security settings.

Figure 3:
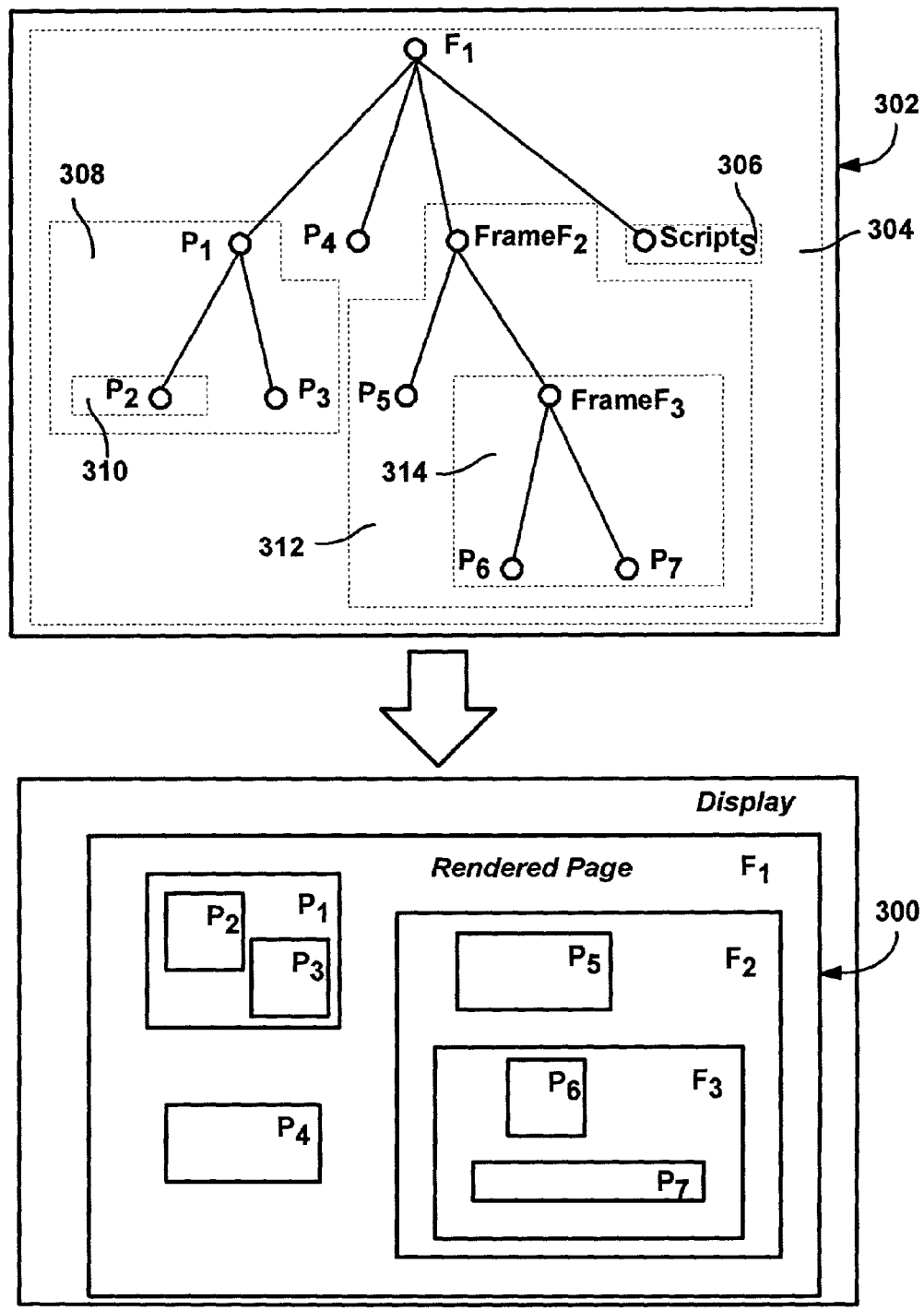
FIG. 3 is a block diagram generally representing an example of a tree structure and corresponding resulting image constructed from some example received content, wherein elements in the tree structure are contained within different security containers in accordance with one aspect of the present invention.

In accordance with another aspect of the present invention, as generally represented in FIG. 3, when a page of content is interpreted and/or otherwise processed for rendering as an image 300, a tree 302 of nodes is first constructed therefor. To accomplish per-element security and/or rules negotiation, the security settings may be associated (e.g., stored) with each node or determined for a given node as needed. This may be a value indicative of a security zone, or may be the settings themselves or a pointer to them. By having the element settings negotiator 248 determine what the security settings should be for any given node, different security levels can be achieved within the same page.

To this end, the element settings negotiator 248 may comprise a rule set that allows security settings to be inherited from a parent element/container, unless separately specified at the child element, and as long as any separately specified settings do not allow more actions than the parent. Such an inheritance-based element settings negotiator 248 is described below with reference to FIG. 5. Note that redirects to other domains do not matter in such a model, since the settings will come down from a parent.

However, an element settings negotiator 248 can do more than simply provide inheritance. For example, security settings can bubble-up from children to parents, e.g., to restrict a parent frame that loads a site known to be untrustworthy, and possibly back down to other children of that parent, e.g., apply the most restrictive settings of any child to the parent, and then everything else below it. The element settings negotiator 248 can also check an actual site (e.g., referenced by a frame) against zone information or the like, whereby, for example, a trusted site can have trusted settings even though it is a frame within a page of a URL with a less trusted zone, e.g., the Internet zone. Thus, via the element settings negotiator 248, security settings can increase or decrease (become more secure or less secure) and change in either direction (parent to child and/or child to parent) within any given page. In sum, the element settings negotiator 248 can essentially control the settings on any given element in any way in which the element settings negotiator 248 is configured to control them, which may be user configurable.

In the example tree 302 of FIG. 3, a parent container is the top-most "frame" $F_1$ containing elements in a logical security container 304 (represented by the dashed surrounding shape) which is associated with one set of security settings. An image, P4, does not have any specifically associated security information, and thus, in an inheritance model, inherits the security of the topmost container 304. Note, however, that the element settings negotiator 248 can decide more than simple inheritance. For example, the element settings negotiator 248 can automatically lower a setting level of "enable" to one of "prompt." The lowering to "prompt" may be based on certain criteria, such as whether an image is being downloaded from some third party site, or is in the cache. This, for example, can provide privacy, e.g., by forcing a user to manually confirm whether an image should really be downloaded or not, since requesting a download of the image tells the remote site that the page is being rendered.

As represented in FIG. 2, a privacy mechanism 250, having access to various privacy-related settings, can also be consulted. For example, a user can have a privacy setting that instructs the browsing software never to download anything from a particular restricted site, regardless of the security setting that may be decided via various rules negotiation.

Returning to FIG. 3, some script, $Script_x$, has its own security data and thus its own logical security container 306 with associated security settings. Another image, $P_1$, has its own associated security settings and contains images $P_2$ and $P_3$. Thus in a straight inheritance model, $P_3$, since $P_3$ has no associated settings of its own, receives the security settings of $P_1$ as represented by the logical security container 308. $P_2$ has its own security settings however, as represented by the logical security container 310.

A frame $F_2$ contains an image $P_5$, as well as another frame $F_3$. In turn, frame $F_3$ contains images $P_6$ and $P_7$. In keeping with the above example, it is seen that Frame $F_2$ has its own security settings as represented by the logical security container 312, which in a straight inheritance model, also applies to $P_5$. Frame $F_3$ has its own associated security settings of its own, thereby defining a logical security container 314, which in a straight inheritance model are inherited by images $P_6$ and $P_7$.

Figure 4:
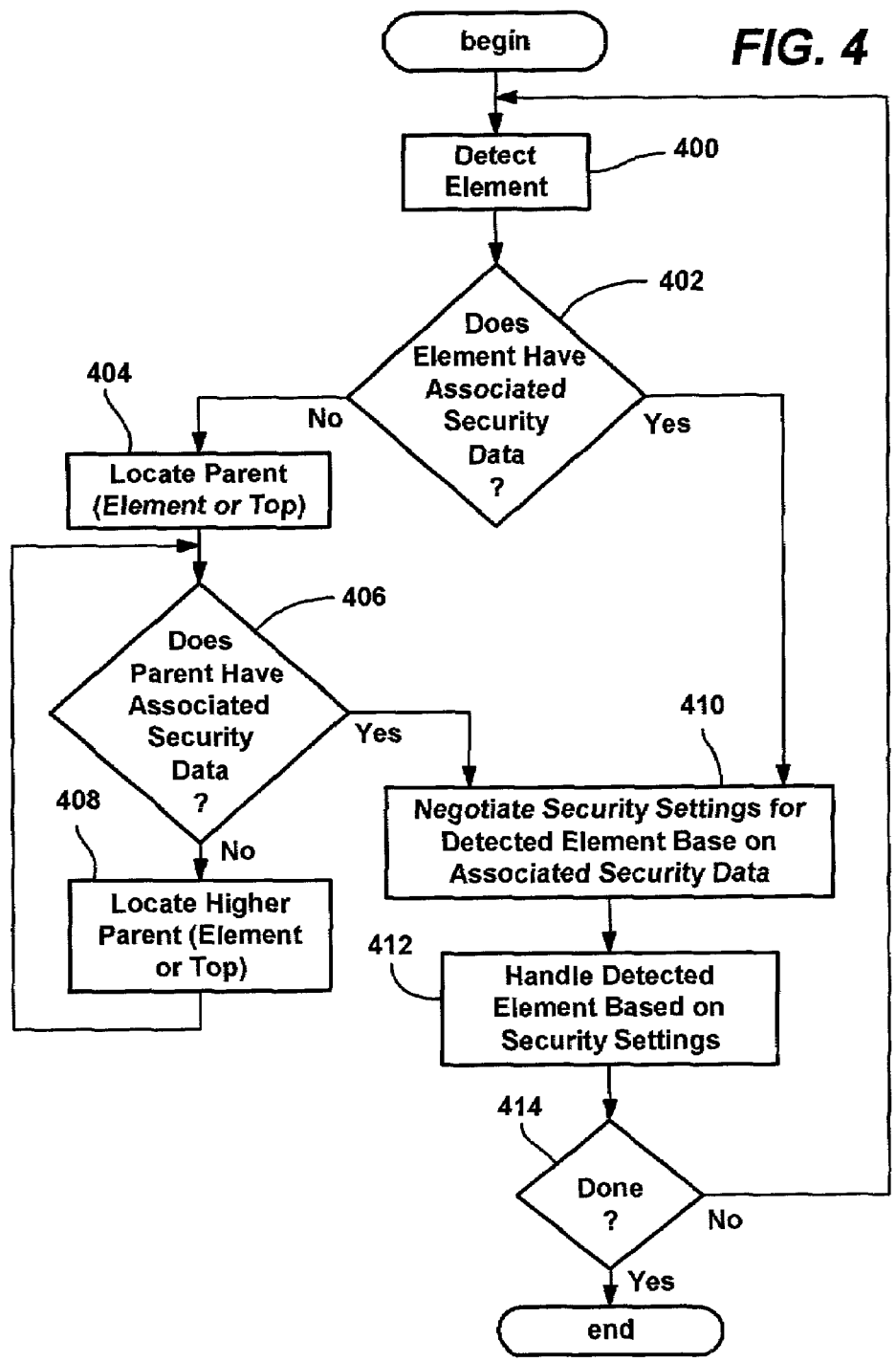
FIG. 4 is a flow diagram representing exemplary logic and related operations performed when handling content having security on one or more elements in a page of content in accordance with one aspect of the present invention.

Turning to an explanation of one way in which the present invention may operate, FIG. 4 represents the page being interpreted for rendering in accordance with an aspect of the present invention. In general, FIG. 4 operates whenever an element on the page is detected at step 400, whereby step 402 looks to see whether the detected element has any associated security data. If so, step 402 branches to step 410 to invoke the element settings negotiator 248 to negotiate or otherwise determine the security settings for this element.

If no settings exist, step 404 is executed, which walks up in the tree to the parent container. Note that at least the topmost container exists before FIG. 4 is invoked on an element, whereby at least the topmost container's security settings will be available. Indeed, it should be noted that in a straight inheritance model, content having no security-tagged elements will be interpreted as before, since the elements will simply inherit the topmost container's settings, as before. Thus, the present invention works with existing content.

Step 406 tests whether the parent container has associated security data. Note that this may be because it was initially tagged with such security data, but also may be because the element settings negotiator has assigned security data to it (e.g., stored it at its node) from a further parent. In the event that the parent does not have data, steps 408 and 406 continue walking up the tree until some parent element or the topmost container is reached that has associated security setting data.

Ultimately a parent element/container will be reached that that has associated security data, whereby step 406 branches to step 410 to invoke the negotiation process (element settings negotiator 248) for determining the settings for this element. Note that negotiation may be followed by an action at step 412, e.g., script can be run (or not), text can be output to a buffer that will represent the page, an image may be downloaded, and so forth. Alternatively, the security settings may be associated with some or all of the nodes in the tree (e.g., in a first pass) before any action is allowed, to manage situations such as those where a child element's security data changes its parent element's associated security settings. Step 414 represents looping until there are no more elements to handle.

Figure 5:
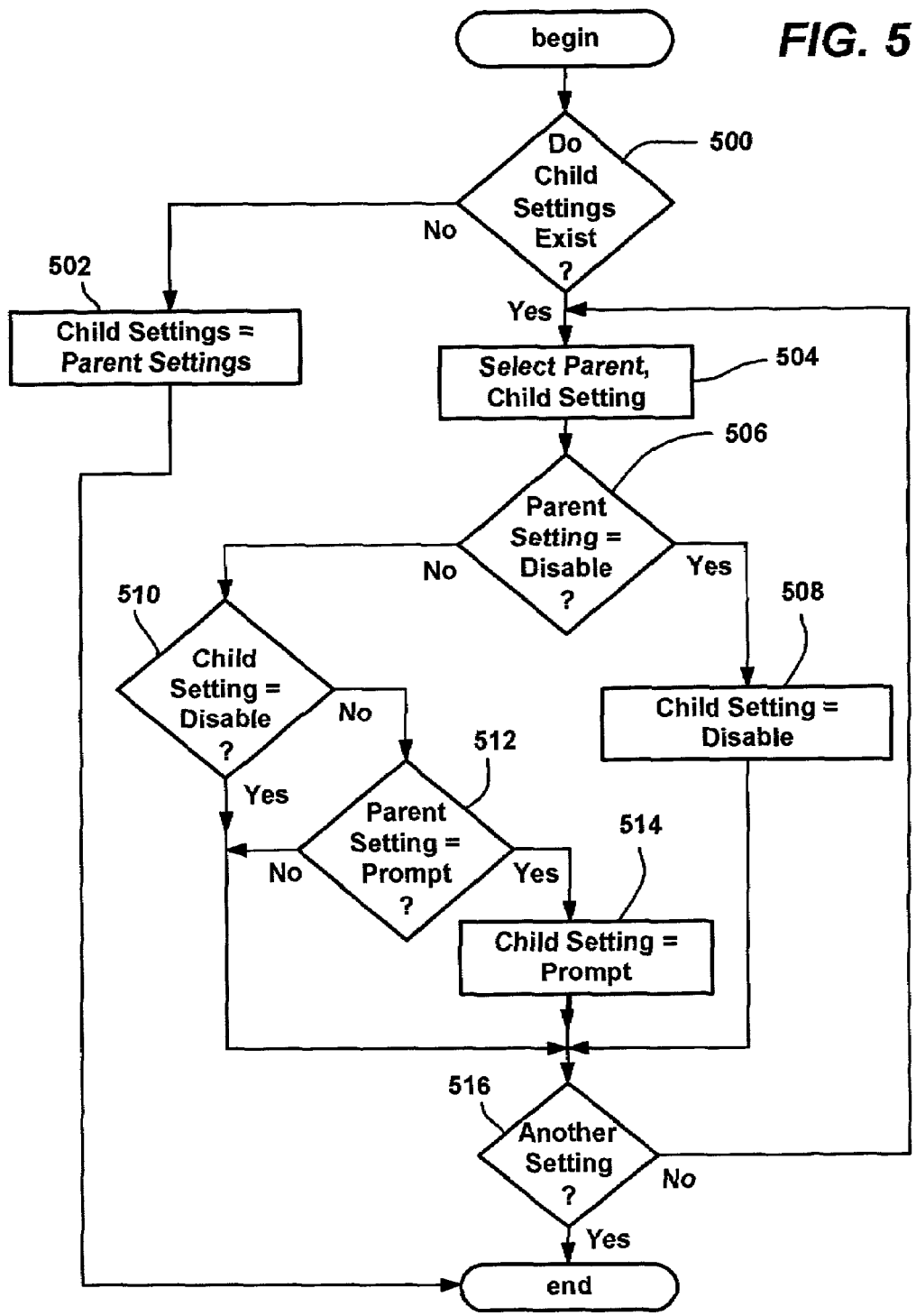
FIG. 5 is a flow diagram representing exemplary logic and related operations performed when negotiating security settings on one or more elements in a page of content in accordance with one aspect of the present invention.

FIG. 5 represents one example of element settings negotiation, a straight inheritance-based negotiation process in which no child has the ability to do more than a parent node can do. Notwithstanding this example, as described above, another element settings negotiator may be more complex. Note that FIG. 5 is limited to enable (allow), prompt, or disable (deny) settings, although as is understood, security settings are not limited to and need not even include these three settings. For example, authentication security settings are directed to different types of logon methods. Further, note that FIG. 5 is more directed to text comparisons or the like as opposed to numerical representations of levels. For example, if settings have numerical levels (wherein the highest number is the least secure such as allow, and the lowest number is the most secure, such as deny), FIG. 5 could simply be replaced by an instructions such as:

If Child Settings do not exist, Child Settings=Parent Settings, else for each Child Setting,
    If Child Setting>Parent Setting, Child Setting=Parent Setting.

Alternatively, in a model where only numeric zones are being used (the lower the number the less trusted), the rule can simply be stated as:

If Child Zone does not exist, Child Zone=Parent Zone, else if Child Zone>Parent Zone, Child Zone=Parent Zone.

Step 500 of FIG. 5 represents testing whether child settings exist for the current element. If not, the child element inherits its parent's (element/container) security settings at step 502, (assumed to exist herein since when interpreting a page, a parent element should be reached before a child element), and the process ends.

If at step 500 the child settings exist, step 504 selects one (a first) of the settings of the parent element and the corresponding setting of the child element to compare via step 506. For example, the setting can correspond to whether signed ActiveX® controls should be downloaded. If at step 506 the parent setting equals "disable" (disallow), the child setting is disabled as well at step 508, since in this particular negotiation process, the rule is that no child element can do more than its parent. The process then continues to step 516 to test for whether there is another setting to compare within the sets of parent and child settings.

If at step 506 the selected setting is something other than disable (i.e., enable or prompt in this example), step 506 branches to step 510 to determine whether the child setting is set to "disable." If so, this is acceptable, since it is not greater than the parent setting, and the child setting is left intact as step 510 branches to step 516 to test for whether there is another setting to compare.

If at step 510 the child setting is not "disable," then the parent setting is tested at step 512 for whether it equals "prompt". If so, at step 514 the child setting is set to "prompt" as well, since no child element can do more than its parent. Otherwise, the parent setting is "enable" whereby the child setting is left as is by step 512, either "enable" or "prompt." The process then continues to step 516 to test for whether there is another setting to compare, which repeats the process on each setting, until the individual settings have been compared.

As can be readily appreciated, the steps of FIG. 5 can be rearranged for efficiency, such as when most parent settings allow actions, e.g., the parent is known to be the topmost container with settings equal to those of the trusted zone. In such an event, it would be more efficient to test whether the parent setting equals "enable" first, since if so, the child setting can simply be left as is.

Note that because zones already exist, security can be implemented per-zone rather than per setting. However, even if zones are used, more fine distinctions can be made by exceptions. For example, a zone may be set on an element such that an image cannot be requested. However, an exception may be made based on other criteria, such as whether the setting for that element was received directly or via inheritance, e.g., the download will be allowed if the setting was inherited, but not if directly set by the page author.

In general, the ability to set security settings on any given element solves the dilemma of trading off needed or desired functionality versus exposing security risks. By providing inheritance, each element need not be provided with its own security settings, but can inherit security settings from a parent element or, from the top-level container, or in some other manner. For example, instead of inheriting the settings from above, a security mechanism negotiator can automatically lower certain security settings for certain types of elements that do not have their own associated security settings. A content author thus need not be concerned with every element in a page, only those for which a different security level is desired.

As can be seen from the foregoing detailed description, there is provided a flexible model which allows page authors to provide different security settings on any element or elements in a page. The security settings on an element can propagate to elements contained thereby via inheritance. The local machine browser retains control of the security settings, however, by requiring that the settings that the elements actually receive be negotiated in accordance with rules or the like.

While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

What is claimed is:

1. In a computer system, a method comprising:
   receiving a page comprising content including one or more elements having active content; and
   controlling page output corresponding to at least part of the content by:
   1) disabling or enabling execution of a first script or loading of a first control corresponding to at least one part of the page based on a first set of security settings; and
   2) disabling or enabling execution of a second script or loading of a second control corresponding to at least one other part of the page based on a second set of security settings, the second set of security settings being different from the first set of security settings.

2. The method of claim 1, wherein receiving the page includes accessing data received from a remote source.

3. The method of claim 1, wherein receiving the page includes accessing data received from a cache.

4. The method of claim 1, wherein a first action including one of execution of the first script or the loading of the first control is requested in the content in the at least one part of the page, wherein a second action including one of execution of the second script or the loading of the second control is requested in the content in the at least one other part of the page, and wherein controlling page output comprises, allowing the first action and disallowing the second action.

5. The method of claim 4 wherein the first action corresponds to a command to run the first script, and wherein the second action corresponds to a command to run the second script.

6. The method of claim 4 wherein the first action further corresponds to a command to download a first set of data, and wherein the second action corresponds to a command to download a second set of data.

7. The method of claim 4 wherein allowing the first action comprises, prompting a user for a decision and receiving a response indicating that the first action is allowed.

8. The method of claim 4 wherein disallowing the second action comprises, prompting a user for a decision and receiving a response indicating that the second action is not allowed.

9. The method of claim 1, wherein a first action including one of execution of the first script or loading of the first control is requested in the content in the at least one part of the page, wherein a second action including one of execution of the second script or loading of the second control is requested in the content in the at least one other part of the page, and wherein controlling page output comprises, disallowing the first action and allowing the second action.

10. The method of claim 1 further comprising:
    retrieving the first set of security settings based on an identifier indicating a source from which the page is obtained, and associating the first set of security settings with the at least one part of the page.

11. The method of claim 10 further comprising, constructing a tree to represent the page, and wherein associating the first set of security settings with the at least one part of the page includes storing data corresponding to the first set of security settings at a node in the tree.

12. The method of claim 1 further comprising:
    recognizing security data associated with an element of the page, and associating the second set of security settings with the at least one other part of the page based on the security data.

13. The method of claim 12 further comprising, constructing a tree to represent the page, and wherein associating the second set of security settings with the at least one other part of the page includes storing data corresponding to the second set of security settings at a node in the tree that corresponds to the element.

14. The method of claim 13 wherein storing data corresponding to the second set of security settings comprises negotiating the second set of security settings.

15. The method of claim 14 wherein negotiating the second set of security settings comprises inheriting at least one setting in the second set of security settings based on security information associated with a parent node in the tree.

16. The method of claim 14 wherein negotiating the second set of settings comprises receiving at least one setting in the second set of security settings based on security information associated with a child node in the tree.

17. The method of claim 1, wherein controlling page output further comprises, accessing privacy settings.

18. A computer-readable medium having computer-executable-instructions for performing the method of claim 1.

19. In a computer connected to a network, a system comprising:
    browser software that interprets content received from the network, and
    a security mechanism that associates a first security zone with a first part of the content and associates a second security zone with a second part of the content, the security mechanism being further operable to associate a first set of security settings with the first part of the content based on the first security zone, and associate a second set of security settings with the second part of the content based on the second security zone, the second set of security settings being different from the first set of security settings, whether execution of a first script or loading of a first control corresponding to the first part of the content is permitted being based on the first set of security settings, and whether execution of a second script or loading of a second control corresponding to the second part of the content is permitted being based on the second set of security settings.

20. The system of claim 19 further comprising, a negotiator that controls the second set of security settings.

21. The system of claim 20 wherein the negotiator controls the second set of security settings relative to the first set of security settings.

22. The system of claim 21 wherein the negotiator controls the second set of security settings relative to the first set of security settings by having at least one setting in the second set be inherited from a corresponding setting in the first set.

23. The system of claim 19 wherein the first set of security settings is based on a network identifier of a source of the content.

24. The system of claim 19 wherein the second part of the content corresponds to an element in the content.

25. The system of claim 24, further comprising a component that detects security data associated with the element.

26. The system of claim 25 wherein the security data associated with the element comprises, a reference to a security zone.

27. The system of claim 25 wherein the security data associated with the element comprises, a reference to a file.

28. The system of claim 25 wherein the security data associated with the element comprises, a reference to a source of remote data.

29. The system of claim 25 wherein the security data associated with the element comprises a string of data corresponding to at least some of the security settings.

30. The system of claim 25 wherein the security data associated with the element comprises information indicating that the security settings should be determined relative to other security settings.

31. The system of claim 19 further comprising, a tree of nodes constructed from the content, the tree including a first node corresponding to the first part and a second node corresponding to the second part.

32. The system of claim 31 further comprising, a negotiator that controls the second set of security settings.

33. The system of claim 32 wherein the negotiator evaluates the second set of security settings.

34. The system of claim 32 wherein the negotiator changes at least one setting in the second set of security settings based on a rule.

35. The system of claim 31 further comprising, at least one other node in the tree that is associated with security settings based on inheriting information from a parent node.

36. The system of claim 35 wherein the parent node comprises the first node.

37. The system of claim 35 wherein the parent node comprises the second node.

38. The system of claim 31 further comprising, at least one other node in the tree that is associated with security settings based on security data of a child node.

39. The system of claim 19 wherein the second part of the content corresponds to a frame tag in the content.

40. The system of claim 19 wherein the content comprises a HyperText Markup Language page.

41. A markup language document, comprising:
a first set of content associated with a first set of security settings, the first set of security settings indicating whether execution of a first script or loading of a first control corresponding to the first set of content is permitted; and
a second set of content associated with a second set of security settings, the second set of security settings being different from the first set of security settings. and the second set of security settings indicating whether execution of a second script or loading of a second control corresponding to the second set of content is permitted.

42. The markup language document of claim 41 wherein the first set of content corresponds to a page, the second set of content is included in the page, and wherein the second set of security settings take precedence over the first set of security settings with respect to determining security for the second set of content.

43. The markup language document of claim 41 wherein the first set of content corresponds to a page and the second set of content corresponds to a frame element included in the page.

44. The markup language document of claim 41, wherein the markup language document includes a reference to a file that corresponds to at least some of the second set of security settings.

45. The markup language document of claim 41, wherein the markup language document includes a reference to a source of remote data that corresponds to at least some of the second set of security settings.

46. The markup language document of claim 41, wherein the markup language document includes a string of data that corresponds to at least some of the second set of security settings.

47. The markup language document of claim 41, wherein the markup language document includes information indicating that at least some of the second set of security settings should be determined relative to other security settings.

* * * * *

UNITED STATES PATENT AND TRADEMARK OFFICE
CERTIFICATE OF CORRECTION

PATENT NO. : 7,318,238 B2
APPLICATION NO. : 10/047302
DATED : January 8, 2008
INVENTOR(S) : Ferhan Elvanoglu et al.

Page 1 of 1

It is certified that error appears in the above-identified patent and that said Letters Patent is hereby corrected as shown below:

In column 7, line 21, delete "herein" and insert -- herein, --, therefor.

In column 7, line 49, delete "tum" and insert -- turn --, therefor.

In column 16, line 23, in Claim 41, delete "settings." and insert -- settings, --, therefor.

Signed and Sealed this
First Day of February, 2011

David J. Kappos
*Director of the United States Patent and Trademark Office*